US009948891B1

(12) United States Patent
Schau et al.

(10) Patent No.: US 9,948,891 B1
(45) Date of Patent: Apr. 17, 2018

(54) CONDUCTING AN AUDIO OR VIDEO CONFERENCE CALL

(71) Applicants: Jonathan Schau, Sudbury, MA (US); Martin R Bodley, Sudbury, MA (US); Antonio Muchaxo, Amoreira (PT)

(72) Inventors: Jonathan Schau, Sudbury, MA (US); Martin R Bodley, Sudbury, MA (US); Antonio Muchaxo, Amoreira (PT)

(73) Assignee: Ziiproow, Inc., Burlington, MA (US)

( * ) Notice: Subject to any disclaimer, the term of this patent is extended or adjusted under 35 U.S.C. 154(b) by 0 days.

(21) Appl. No.: 15/472,612

(22) Filed: Mar. 29, 2017

(51) Int. Cl.
H04N 7/15 (2006.01)
H04N 7/14 (2006.01)
H04L 29/06 (2006.01)
G06F 3/16 (2006.01)

(52) U.S. Cl.
CPC ............ *H04N 7/147* (2013.01); *G06F 3/167* (2013.01); *H04L 65/403* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 2007/0081651 A1 | 4/2007 | Iyer et al. | |
| 2010/0289867 A1 | 11/2010 | Nimri | |
| 2010/0315483 A1 | 12/2010 | King | |
| 2011/0167078 A1* | 7/2011 | Benjamin | G06Q 10/107 707/769 |
| 2016/0127351 A1* | 5/2016 | Smith | G06F 21/316 726/10 |

* cited by examiner

*Primary Examiner* — Joseph J Nguyen
(74) *Attorney, Agent, or Firm* — Robert Schuler (57) ABSTRACT

An A/V conference device located in each of a plurality of A/V conference call spaces operates to receive, process and transmit audio and video information over a network to a far-end location during a conference call, and an A/V conference service operates in the network to setup, support, and terminate conference calls between the A/V conference devices. The A/V conference call device has conference call control functionality that detects the presence of one or more individuals in the conference call space, and which prompts the individuals for call setup information that is sent to the A/V conference service operating in the network. The individual can move to be present in any one of a plurality of available conference spaces and initiate a conference call without the need to provide scheduling information to the A/V conference service prior to or after entering the space.

21 Claims, 11 Drawing Sheets

MULTIPOINT VC SYSTEM ARCHITECTURE 100

FIG. 1

MULTIPOINT VC SYSTEM ARCHITECTURE 100

CONDUCTING AN AUDIO OR VIDEO CONFERENCE CALL

1. FIELD OF THE INVENTION

The present disclosure relates to avoid/video conference system technology, and to a system for supporting an ad-hoc audio-video conference session.

2. BACKGROUND

Figure 1:
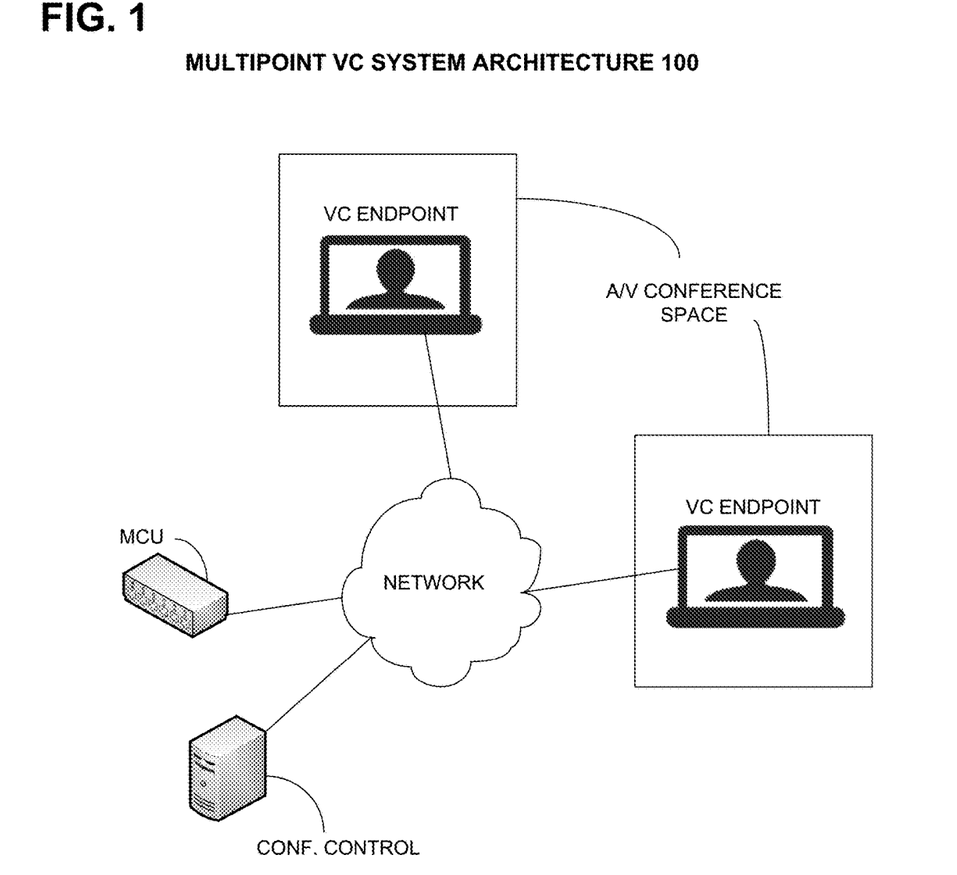
FIG. 1 is a diagram showing a proprietary video conferencing system architecture.

Meetings between multiple individuals conducted in two or more separate locations that are remote to one another can be facilitated using audio and/or video (A/V) conferencing services provided by a dedicated conferencing system, or by a web based conferencing application. Historically, proprietary conference systems have been somewhat cumbersome to use, and a conference call could only be competed between two or more similar proprietary systems or systems configured to support audio/video information in a particular proprietary packet format. Such proprietary conference system 100 architecture is illustrated in FIG. 1. Scheduling and initiating video conference calls using a proprietary video conference system requires some degree of familiarity with the system, the system needs to be reserved prior to being used, and there is some system setup needed prior to completing a conference call with a far-end system.

More recently, web or cloud based video conferencing services have become available that support conference calls between two or more endpoints each having any type of computational or communication device that can connect to a communication network and run some sort of a video conference client application. Services of this type are offered by Microsoft under the trade name Skype, and by Google under the trade name of Google Hangouts, and others. These cloud based conferencing services have greatly reduced the infrastructure cost needed to support A/V conference calls, as call can be initiated between two or more points using almost any type of communication device, be it mobile or stationary.

While there are advantages to being able to conduct a conference session using a personal communication device (whether it is mobile or stationary), some conference sessions are best conducted in a location that has non-proprietary equipment that is specially designed to support a conference call, such as a larger display, better sound and video processing equipment, better microphones, better acoustics, to name a few. This non-proprietary A/V equipment is typically much less expensive that the proprietary equipment and it can be installed in an enclosed area of various different sizes in order to provide for a higher quality conference experience.

3. BRIEF DESCRIPTION OF THE DRAWINGS

The present invention can be best understood by reading the specification with reference to the following figures, in which.

4. DETAILED DESCRIPTION

While non-proprietary A/V conference equipment in combination with a web based conferencing service has been instrumental in expanding the acceptance of A/V conferencing as a mode of communication, it is necessary for users of this type of conferencing service to locate particular conference rooms that are available for calls, to coordinate the scheduling of A/V equipment in the conference rooms for use at both near and far end locations, and it is necessary to manually initiate a scheduled call.

In lieu of the steps that users of such conferencing system currently need to perform in order to conduct a A/V conference call, and to facilitate the use of A/V conference services, we have designed an A/V conference room environment that operates to automatically start an A/V conference call between two of more A/V conference devices without the necessity of reserving any of the A/V communication devices located in two or more conference spaces that are remote with respect to each other. Accordingly, an individual can enter any available A/V conference space to initiate a conference call, or join a conference call that is in progress, without scheduling A/V conference devices in the space for use, and without scheduling an A/V conference service.

More specifically, specially designed A/V conference call control functionality, running on a mobile A/V conference device operated by a first individual, or running on a stationary A/V conference device located in a conference space, can operate to detect presence information in the conference space, and it can operate to cause a query to be played on the mobile or stationary A/V conference device to request a reason for the individual's presence in the conference space. In response to the query, the individual can provide information that a network based A/V conference call service can use to complete a conference call between the A/V conference device in the conference space and with other individual(s) located in one or more far-end conference spaces, or with a mobile A/V conference device associated with the other individuals. The conference call information provided by the individual can comprise contact information associated with one or more other individuals with which the individual would like to enter into a conference call, or information that is specific to a particular call such as who will present, agenda topics or other meeting specific information.

As described above, the specially designed A/V conference call control functionality allows an A/V conference call to be completed between A/V conference devices in multiple A/V conference spaces that are remote with respect to each other without the need to reserve conference services for the equipment comprising any particular conference space. In this regard, the A/V conference call control functionality implements a conference call service that supports the establishment of a fully ad-hoc A/V conference call in any A/V conference space by allowing any two or more individuals or participants, which are located remotely with respect to each other, to arbitrarily enter any two or more A/V conference spaces that are not currently being used, and to initiate an A/V conference call between the two or more participants.

According to another embodiment, an A/V conferencing service can be provided with a conference call starting time and with the identities of two or more individuals who are participating in a conference call without reserving particular conference spaces that can be used to complete the conference call.

In another embodiment, a first individual can be in a conference call on their mobile A/V conference device with a second individual who is either in an A/V conference space or not at the time the first individual's presence is detected in an A/V conference space, and an A/V conference device in the conference space into which the first individual moves can be automatically brought into the conference call with the second individual as an additional end-point.

In still another embodiment, the first individual, who is not currently in a conference call, can move into any one of a plurality of A/V conference spaces (that is not in use) where their presence is detected, and where they are queried as to the reason for their presence in the conferencing space, and if the first individual responds with an indication that they would like to participate in an ongoing conference call, the A/V conference device in the conference space into which the first individual moves can automatically be brought into the ongoing a conference call without any manual intervention by the first individual.

For the purpose of this description, an audio or video (A/V) conference space is considered to be any space (near-end or far-end) that comprises equipment, some or all of which is able to be connected to a network (local or wide area), and which can operate to support an audio or a video conference call. The equipment operating to support a conference call in an A/V conference room (hereinafter referred to as a conference space) can be comprised of, but is not limited to, equipment having audio and video processing functionality, one or more image or presentation displays, one or more microphones, one or more cameras, and one or more devices to control a conference session. Any one or more of the items of equipment can be in wired or wireless communication with any of the other items of equipment or with the network. The network can be a public or a private network and operate according to any suitable network protocol (IP, ISDN, PSTN, Wi-Fi, DECT, Ethernet, etc.).

A mobile A/V conference device, for the purpose of this description, can be a mobile phone, personal digital assistant, a tablet computer, a laptop computer, or any other type of mobile device that is able to connect to a wireless network and has functionality that is able to support an A/V conference call, and a stationary A/V conference device, for the purpose of this description, can be any computational device configured to process audio and video information and able to communicate over a network.

The specially designed A/V conference call control functionality mentioned earlier is referred to hereinafter as a CC control function that is implemented in either computer hardware or software and generally operates to register the CC control application with an A/V conference call service (CC service) running in a network or cloud, it operates to detect the presence of a mobile device (on which it runs) in an A/V conference space, and depending upon detected presence information, it operates to interact with an A/V CC service (such as Google Hangouts, SfB, etc.) to start, terminate or to support an active A/V conference call.

Figure 2A:
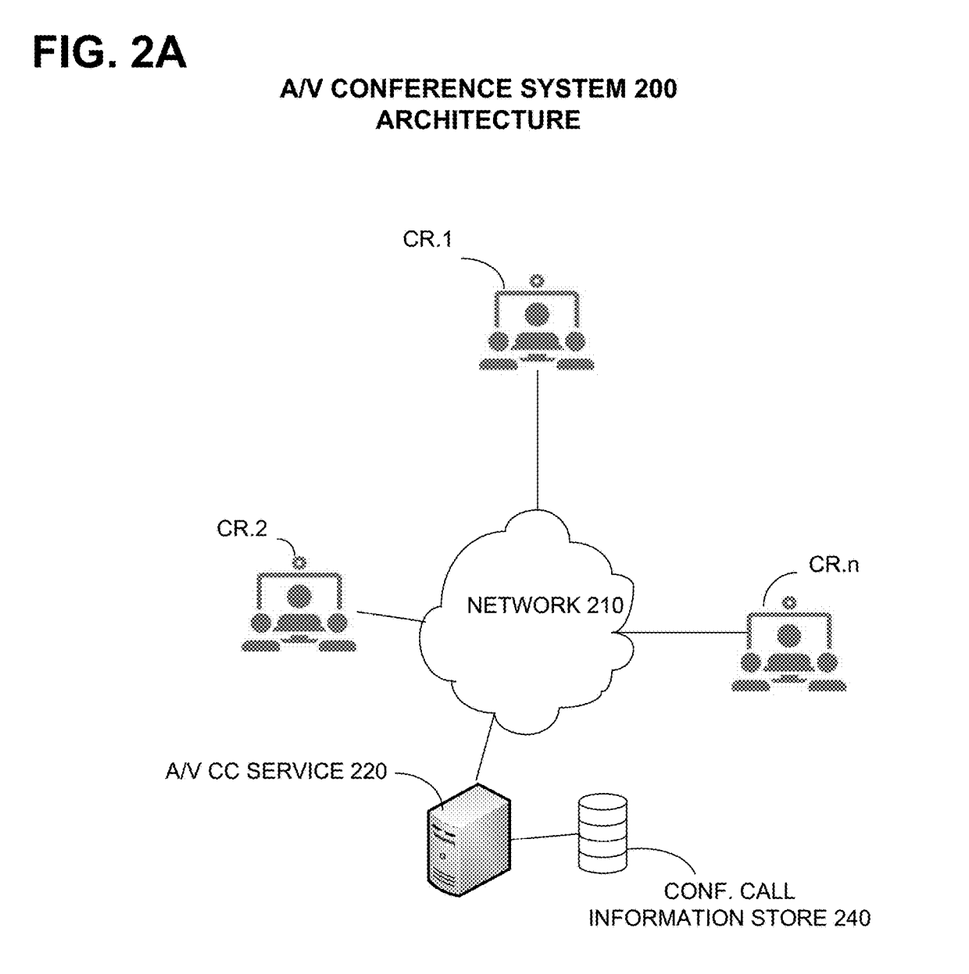
FIG. 2A is a diagram showing a non-proprietary audio or video (A/V) conference system 200 architecture.

Referring now to a network A/V conference system 200 architecture shown in FIG. 2A, this conference system comprises some number of A/V conference rooms or spaces, CR.1, CR.2-CR.n (with n being an integer number) that have A/V conferencing equipment that can be linked to one another during the course of a conference call over a local or wide area network 210. The equipment in each CR is describe later in detail with reference to FIG. 2B, but generally is comprised of one or more image/video capture devices, one or more microphones, one or more displays, and a network interface device or appliance (stationary A/V conference device) that has audio and image or video processing functionality, and that operates to transmit and receive audio and video information to and from one or more far-end CR that are connected to a common conference call. The stationary A/V conference device also has an A/V conference client application or A/V conference plug-in functionality that operates in conjunction with an A/V conference service 220 that runs someplace in the network 210. The service 220 can be any one or more of a number of different A/V conference services supported by organizations such as Google, Microsoft, Cisco and others. Generally, the service 220 operates to in a manner similar to that of a multi-point control unit (MCU) to receive call setup information (network addresses, call times, etc.) and to facilitate network connectivity between the call end-points during the course of a conference call.

Figure 2B:
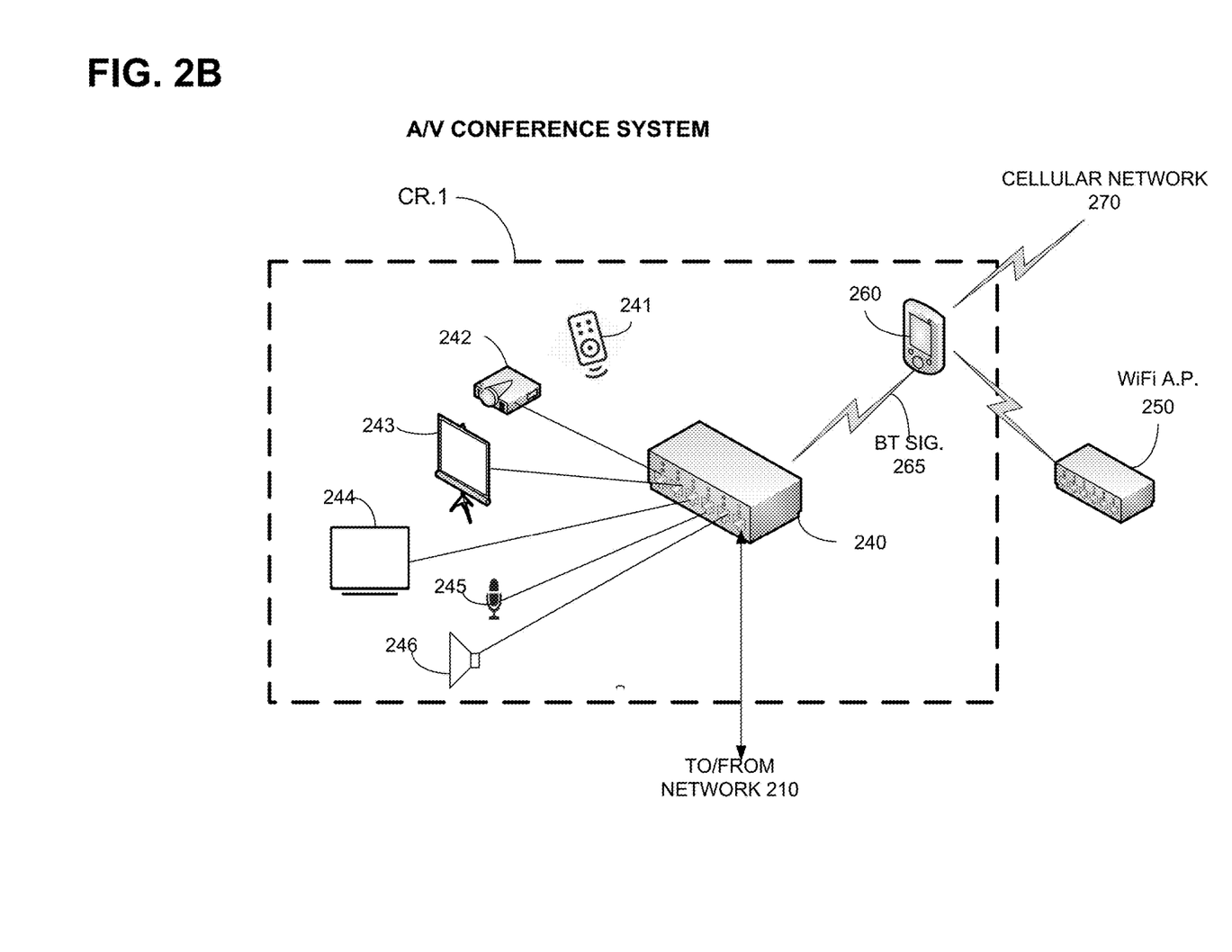
FIG. 2B is a diagram showing component parts comprising an A/V conference system in a conference room.

Referring now to FIG. 2B, the CR.1 has an A/V conference device 240 to which are connected a number of peripheral devices. Any CR can have more or fewer peripherals connected to a device 240, but each CR has at least one device 240. The functional elements comprising the device 240 will be described in more detail later with reference to FIG. 3, but generally this device can be any computational device that is able to be configured with audio and video processing functionality, and operate to transmit and receive audio and video information to and from a network, such as the network 210 in FIG. 2A. Certain aspects of the device 240 operation can be controlled with a remote control device 241, such as control over the operational mode (i.e., on/off/stdby) of the device, volume control over one or more speakers 246, mute control, call set-up, camera control, start and termination to name only a few. Although not limited to the peripherals shown in FIG. 2B, peripheral devices that can be connected to the device 240 are the speaker 246, one or more displays 244, one or more wired or wireless microphones 245, a white board 243, and a projector 242. As described earlier, the device 240, in combination with at least the microphone 245, the display 244 and the loud speaker 246, can be considered a stationary A/V conference device. Also shown in FIG. 2B is a mobile A/V conference device 260 that operates to, among other things, run a specially designed A/V conference call control function that will be described in detail later with reference to FIG. 5. The mobile device generally comprises functionality that allows it to receive Bluetooth signals 265 from a BT beacon or other short range wireless signal (i.e. ultrasonic signal) comprising the device 240, or the CR.1, that allows it to communicate over a cellular network 270 and to communicate over a Wi-Fi or other medium range wireless network technology access point 250. The mobile device 260 can be any mobile, computational device that is designed to connect to a communication network to transmit and receive audio, video, and data information, and which is able to run an A/V conference application. The mobile device 260 is designed to be easily moved or carried around by an individual, and controlled by the individual to enter into and exit an A/V conference call or to send presentation information to the appliance 240 during the course of a conference call, and in this respect the mobile device 260 is considered herein to be a mobile A/V conference device. Functionality comprising the mobile device 260 will be described in greater detail later with reference to FIG. 4.

Figure 3:
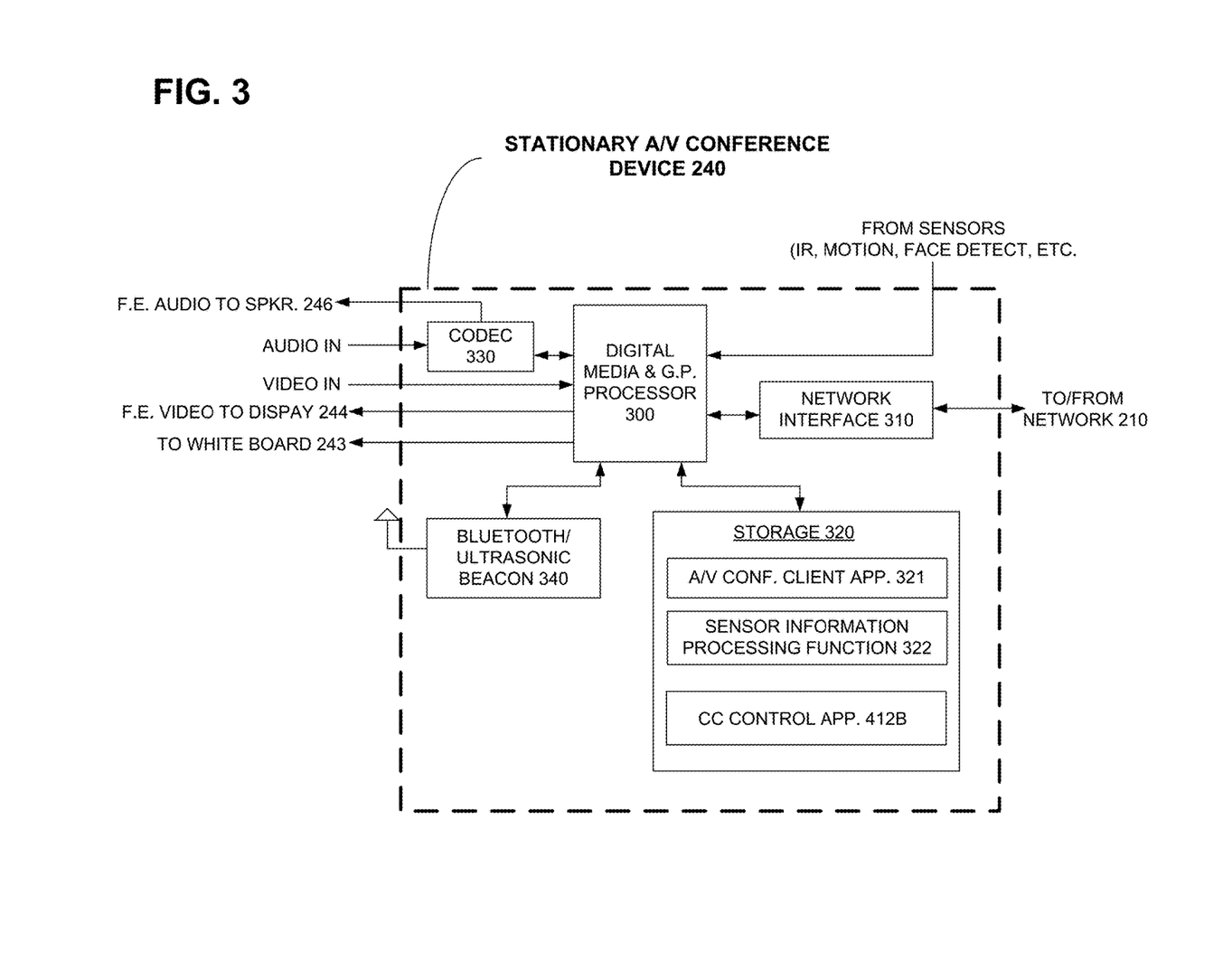
FIG. 3 is a diagram showing functional elements comprising a networked A/V conference appliance 240.

FIG. 3 is a block diagram showing functionality comprising the stationary A/V conference device 240 described earlier with reference to FIG. 2B. As described earlier, the device 240 has functionality for processing audio and video or image information and transmitting this processed information to far-end A/V conference device (mobile or stationary) over the network 210, and it has functionality for receiving audio and video or image information from a far-end location and playing the information over the speaker 246, display 244 or white board 243. The design and operation of audio/video/image processing equipment are well understood by those familiar with such equipment, and so will not be described here in any detail other than to mention that an audio codec 330 operates to receive and sample audio information from the microphone 245 and to send the coded audio information to a processor 300 (such as a DSP) where it is converted to a format suitable for transmission over the network 210, and the codec operates to receive audio information from a F.E. conference room via the processor 300, decodes the information and sends to the loud speaker 246 where it is played. The processor 300 also receives signal from one or more sensors positioned strategically in the CR. The sensors can be of various types that are designed to detect the presence of an individual in the CR, such as an IR detector, a motion detector, still image camera to name three.

The device 240 also comprises a beacon 340 implementing a short range, low power wireless signal transmitter such as Bluetooth or an ultrasonic signal. This beacon 320 periodically transmits a signal having the unique identity of the beacon, which in this case is mapped to the particular CR that the device 240 is located in. The beacon signal can be received by a mobile device, such as the device 260 in FIG. 2B, and the unique identifier comprising the beacon signal can be used to determine a current location of a mobile device. Alternatively, the beacon 320 does not have to be implemented in the device 240, but can be a discrete device located any place in a conference space. The device 240 also has storage 320 that can be any form of non-volatile memory suitable for storing functionality such as an A/V conference client application 321, a sensor information processing function 322, and it can also store an A/V conference call control application 412B. The A/V client application 321 generally operates to place audio and/or video information captured by microphones and cameras in the CR into a format that is compatible with the A/V conference service being used during a conference call. Such A/V conference client applications are typically made freely available by organizations like Microsoft, Cisco, and Google to name only three.

Figure 4:
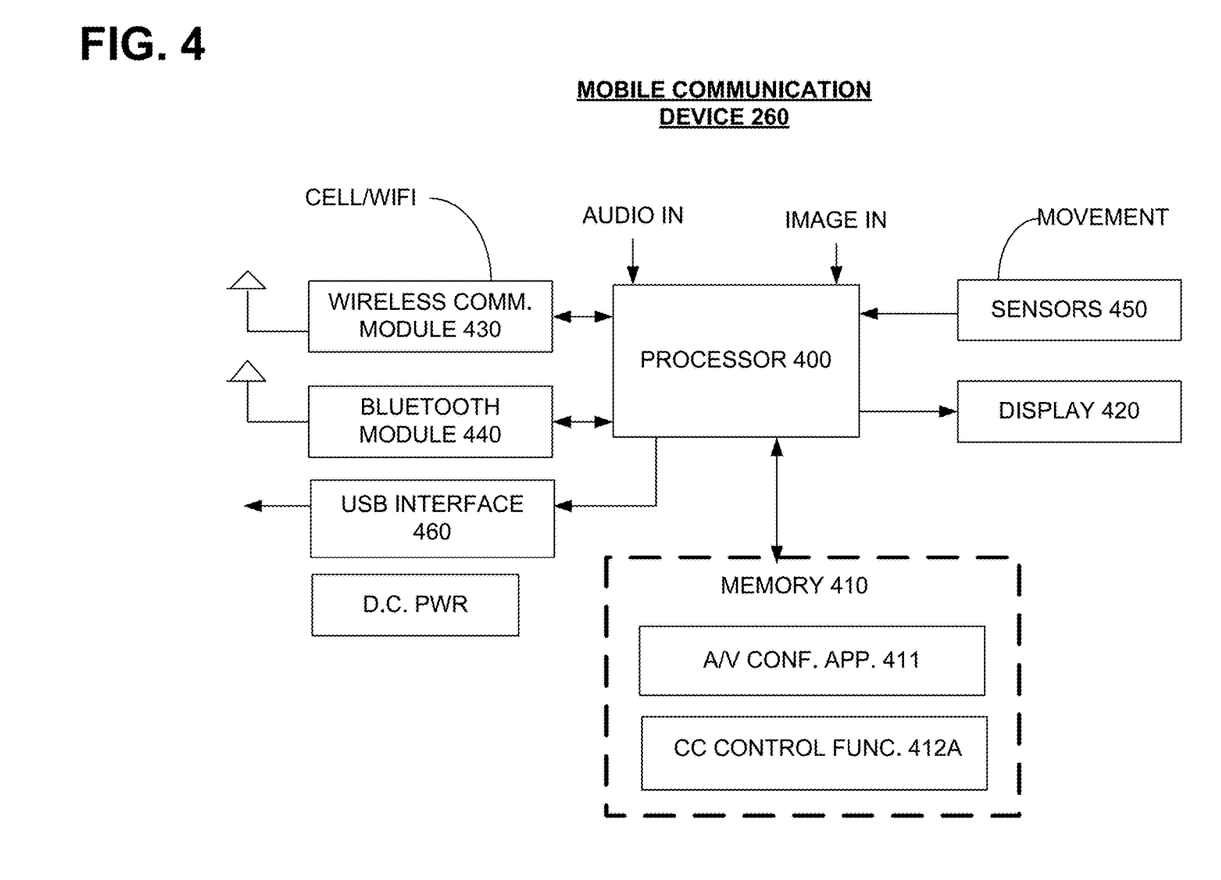
FIG. 4 is a diagram showing functional elements comprising a mobile device 260 that is configured to support an A/V conference call.

As previously described, the mobile device 260 can be any type of portable communication device, such as a mobile phone, PDA, tablet computer or laptop computer that is able to connect in a wireless or wired manner with some type of communication network. The network can be a cellular network, and Ethernet, Wi-Fi or DECT network, a Bluetooth network, any type of telephone network, or any type of network that is suitable for transmitting audio, video or data information from one location or end point to one or mother other locations of end points. As shown in FIG. 4, the mobile device 260 is comprised of one or more processors 400 that operate to process incoming or outgoing audio, video and/or data information, and which controls the operation of one or more native or non-native applications stored in memory 410. A mobile A/V conference application 411 and a specially designed A/V conference call control function 412A (substantially similar to the function 412B stored in association with the device 240) are shown stored in the memory 410. Specifically, the A/V conference function or application 411 can be a client application with respect to a A/V conference service running in the network 210, and it can operate to place audio and/or video information generated by the mobile device 260 into a format that is compatible to the network A/V conference service, and to place audio and/or video information transmitted to the mobile device 260 by the network conference service into a format that is compatible with the mobile device.

The A/V conference call control application 412A comprises logical computer instructions controlled by the mobile device processor 260 to run functionality that, among other things, operates to detect whether the mobile device is located in a particular CR, to initiate a registration operation, to initiate a mobile device user query, and to support the initiation and termination of conference calls. When located in any of the conference rooms, CR.1-CR.n, described earlier, the conference call control application 412A operates, to create an interactive A/V conference room environment that facilitates the automatic initiation and termination of an A/V conference call without the need to reserve A/V conference services and without the need to reserve any particular A/V conference space(s) that are remote to one another. The operation of the conference call control application 412 to facilitate the interactive A/V conference room environment is described below with reference to FIG. 5.

Figure 5:
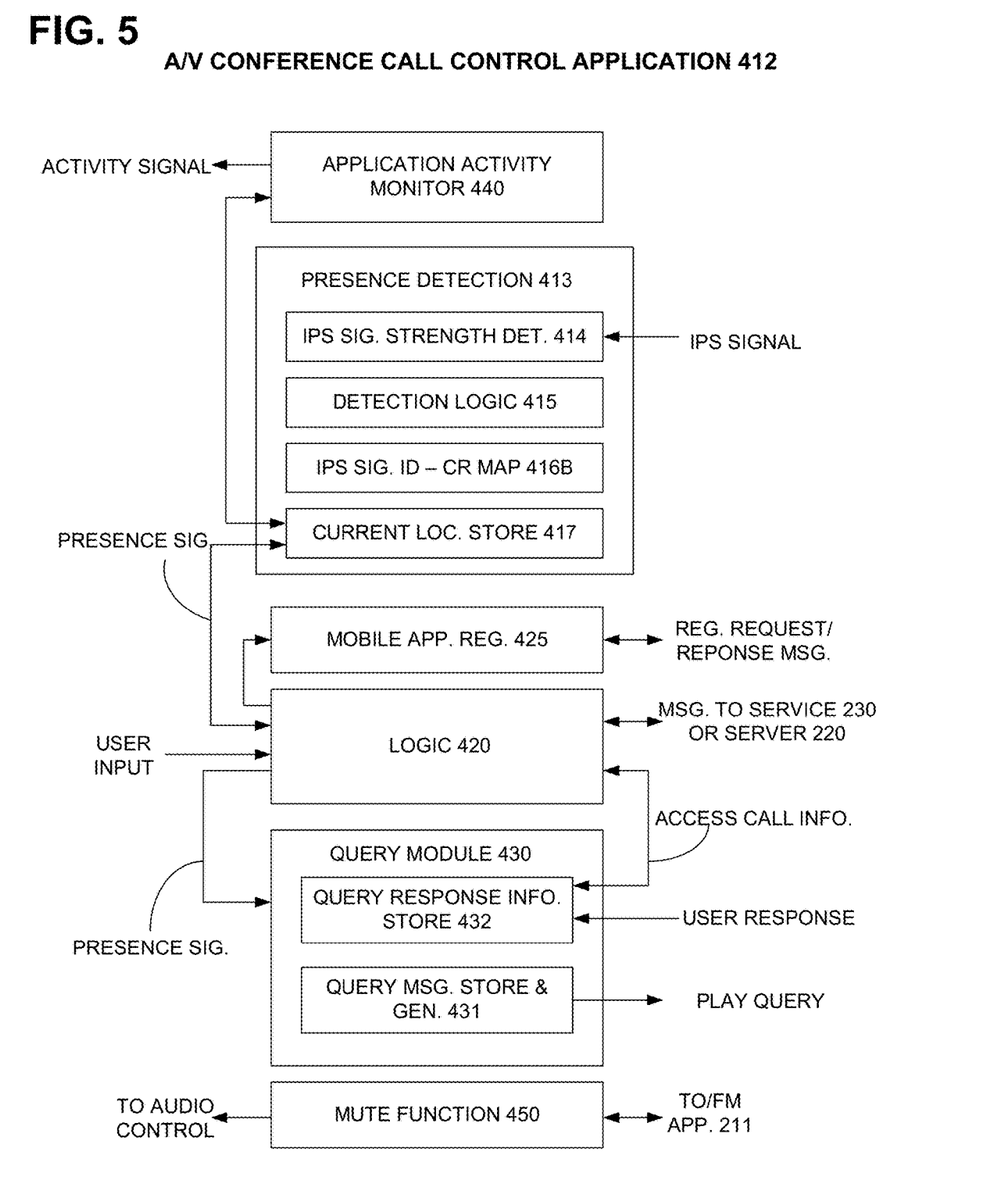
FIG. 5 is a diagram showing functional elements comprising a conference call control application running on either or both of the mobile device 260 or the appliance 240.

The A/V conference call control application 412 shown in FIG. 5, or simply the conference call control application (CCC application 412), can run on either or both of the mobile device 260 or the A/V conference appliance, and is comprised of presence detection functionality 413 that operates to detect and measure a strength of a beacon signal, an ultrasonic signal, or a signal generated by any other indoor positioning system (IPS) device. The application 412A also has a mute function 450 comprising the call control application 412 operates to determine when the A/V conference application 411 is active, and if it is active the function 450 control the mobile device 260 loudspeaker and microphone to be muted.

Specifically, the detector 413 is comprised of an IPS signal strength detector 414 that receives signals from a beacon, an ultrasonic signal generation device, or from any other type of IPS signal generation device and measures the signal strength. Detection logic 415 compares the signal strength of the received IPS signal to a pre-determined, stored IPS signal strength threshold value (not shown), and if the IPS signal strength is greater than the threshold value, the logic 415 uses information in the signal, that uniquely identifies the IPS signal generation device, as a pointer into a map 416B to determine the current location of the mobile device 260 running the application 412A. The map 416B stores a correspondence between the unique identity of each IPS signal generation device and its conference room location, which in this case is one of the conference rooms, CR.1 to CR.n. In the event that the IPS signal detector 414 detects more than one IPS signal from a beacon, the logic 415 can cause the detector to ignore beacon signals, and only process ultrasonic detector signal strength. Regardless of the IPS signal that is received by the detector 414, the current location of the mobile device is maintained in a store 417, and the store is updated every time the mobile device enters a CR.

Continuing to refer to FIG. 5, logic 420 can, among other things, periodically examine the store 417 and determine that the mobile device 260 is currently located in a particular CR, CR.1 for instance. If the logic 420 determines that the mobile device 260 is present in CR.1, it can cause a message to be generated and sent by the mobile device 260 to the A/V CC service 220 for the purpose of allowing/permitting a user of the mobile device to participate in a conference call in the CR.1. Subsequent to the logic 420 determining that the mobile device is present in CR.1, it can control a query module 430 comprising the call control application 412 to play a query message to the mobile device user requesting to know why the user is present in the CR. One or more standard query messages [i.e., Q: why are you in this room; Q: please send CR authentication code, etc.] can be maintained in the store 431, and depending upon certain detectible presence characteristics, any one of these query messages can be played over the mobile device loud speaker, or it can be played as a text message on the device display. A presence characteristic can include, but is not limited to whether the user is the first person in the CR, whether the user is the meeting chair, whether the user routinely starts a recurring meeting, did the user record a recurring meeting, and did the user order lunch during a meeting. Other query messages played can include, but are not limited to, whether the user wants to record a meeting, whether the meeting is to be translated, and whether a meal is to be ordered during the course of the meeting. A response by the user to the query message can be received by the query module 430 and maintained in the store 432. The user response to the query message can be an indication that they are in the CR for the purpose of starting a new conference call with one or more individuals, or that they would like to join a conference call that is already in progress. Further, a user response can have conference call set-up information, or information relating to a conference call that is already in progress. For example, the mobile device user can respond that they would like to initiate a conference call (CC) with one or more individuals at a particular time. After responding to the query with call participant names, the application 412A can access the service 220 for participant contact information, such as mobile device address and ID. The logic 420 can send the CC contact information to the A/V conference application 411 running in the mobile device 260, and the A/V conference application can format an A/V conference call invitation and send the invitation to the A/V conference service 220 connected to the network 210, which in turn can send the invitation to the individuals being invited to participate in the CC. The invitation can be sent to all mobile devices associated with the invitees and which is running a call control application (similar to the call control application 412A in FIG. 5) that can be authenticated with the service 220. Provided the individual who initiated the CC is currently present in CR.1, the A/V conference service 220 (running in the network 210) will control the appliance 230 in CR.1 to connect to the CC.

Subsequent to the invitees receiving a message that they are invited to participate in a CC, they can either move to any available CR to participate in the call, or they can enter the call using their mobile device. In the event that an invitee elects to move to a CR, their presence in the CR will be detected by a call control application (similar to the conference call control application 412A) running on their mobile device, and as described earlier with reference to FIG. 5, this call control application will operate in conjunction with the A/V CC service 220 to automatically control the A/V conference equipment in the CRs to enter the CC and allow the invitee to participate in the call. More specifically, when the presence of other authorized invitees is detected in a far-end CR, the service 220 can control an A/V conference device in the F.E. CR to also connect to the CC. It should be understood, that an invitee to the CC can move to any available CR, and invitee's presence in the CR can cause the A/V conference device in the CR to connect to the CC. Further, it should be understood, that the identities of any particular CR do not need to be specified in an invitation to participate in a CC. Any CR that is not currently being used for a CC can be used by any invitee to a CC. Further, it should be understood that either or both of the mobile device 260 and the stationary conference device 240 can be configured with the CCC applications 412A and 412B. Both of these applications operate in substantially the same manner, and may differ only to the extent that they operate using different operation systems.

Figure 6:
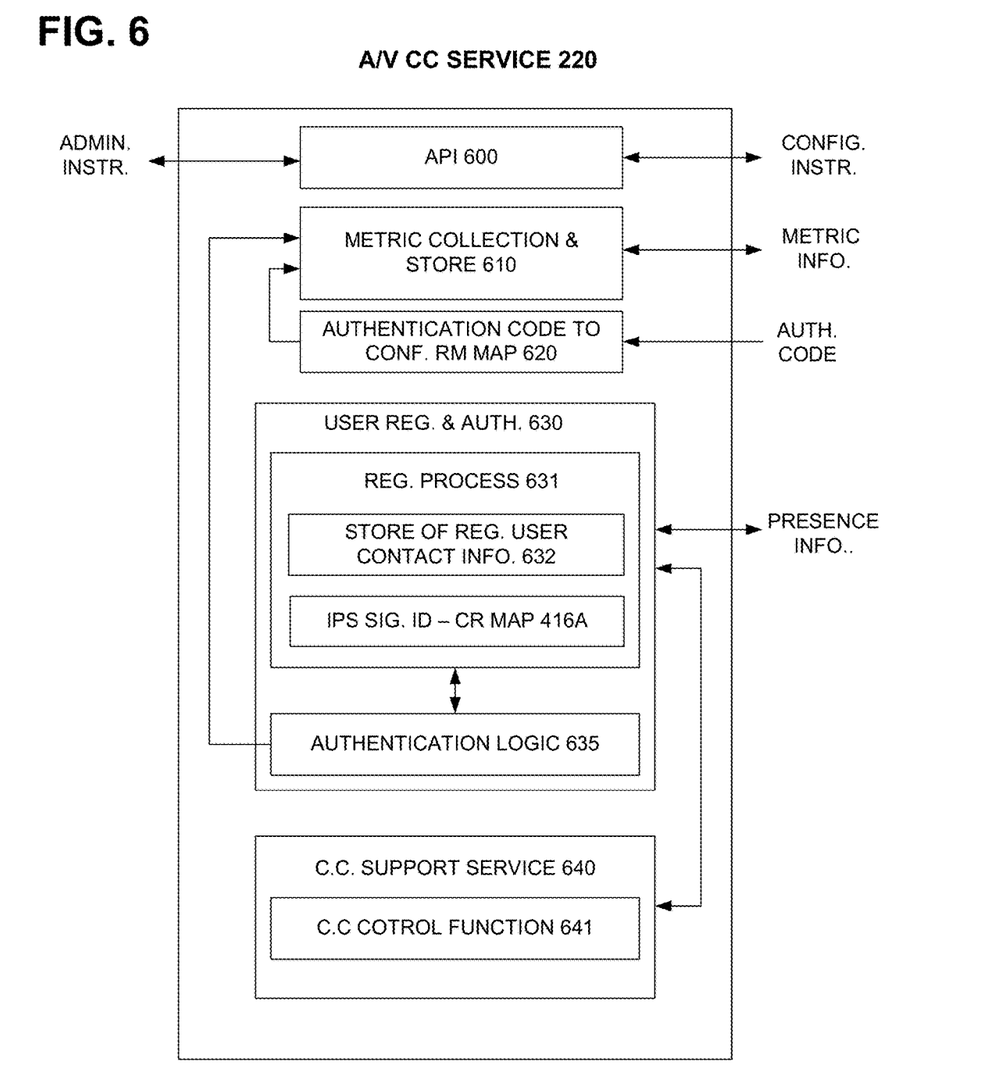
FIG. 6 is a diagram showing functionality comprising a web-based A/V conference call service 220.

Referring now to FIG. 6, the A/V CC service 220 running in the network 210 generally runs a conference call support service 640, has an API 600 that allows an A/V conference system administrator to configure the A/V conference appliances comprising each of the CRs, it has a metric collection and storage module 610 that implements the collection of CR metrics, it has an authentication code to CR map 620, and it has a user/application registration and authentication module 630 that implements a process whereby an A/V conference call control application is registered with the service 220. The conference call support service 640 is comprised of a conference call control function 641 that operates to control the inclusion of two or more A/V conference devices (mobile or stationary) in a conference call. Each conference call control application 412A or 412B can be registered with the service 220 prior to being permitted to take part in the CR environment implemented by it in coordination with the service 220, and A/V conference equipment comprising any available CR. The authentication module 630 is comprised of a registration process module 630 and user authentication logic 635. The registration process 630 generally supports individual user requests to register their conference call control application (such as the application 412) with the service 220. During the registration process, the service 220 can request that the call control application user provide certain personal, and to provide certain contact information that can be an electronic mail address, a phone number, a network address, or some other information that allows the service 220 to communication with a mobile communication device running an A/V conference call control application, such as the application 412. During this registration process, the authentication module 630 can transmit information comprising the IPS signal to CR map 416A to the mobile device running the application 412 for storage and later use. The contents of the map 416A stored in association with the service 220 and the map 416B stored in association with the call control application 412 are the same, and can be periodically updated as necessary. Alternatively, the map 416A can be stored in the network 210 in association with the service 220 and be access as needed by the application 412. The authentication module 630 can receive presence information in a presence message generated by a call control application running on a mobile device that can include, among other things, the identity of the individual using the mobile device (as evidenced by a call control application registration number), and it can include the unique identity of a beacon or ultrasonic signal received by the mobile device while present in the CR. Authentication logic 635 comprising the authentication module 630 can use the identity (i.e., registration information) of the call control application to authenticate the mobile device user (by comparing the received registration number with the registration numbers maintained in the store 632, and the logic can use the unique IPS identity as a pointer into the map 416A to identify the room in which the mobile device is currently located, and this information along with the user identity can be sent to the metric collection store 610.

Figure 7A:
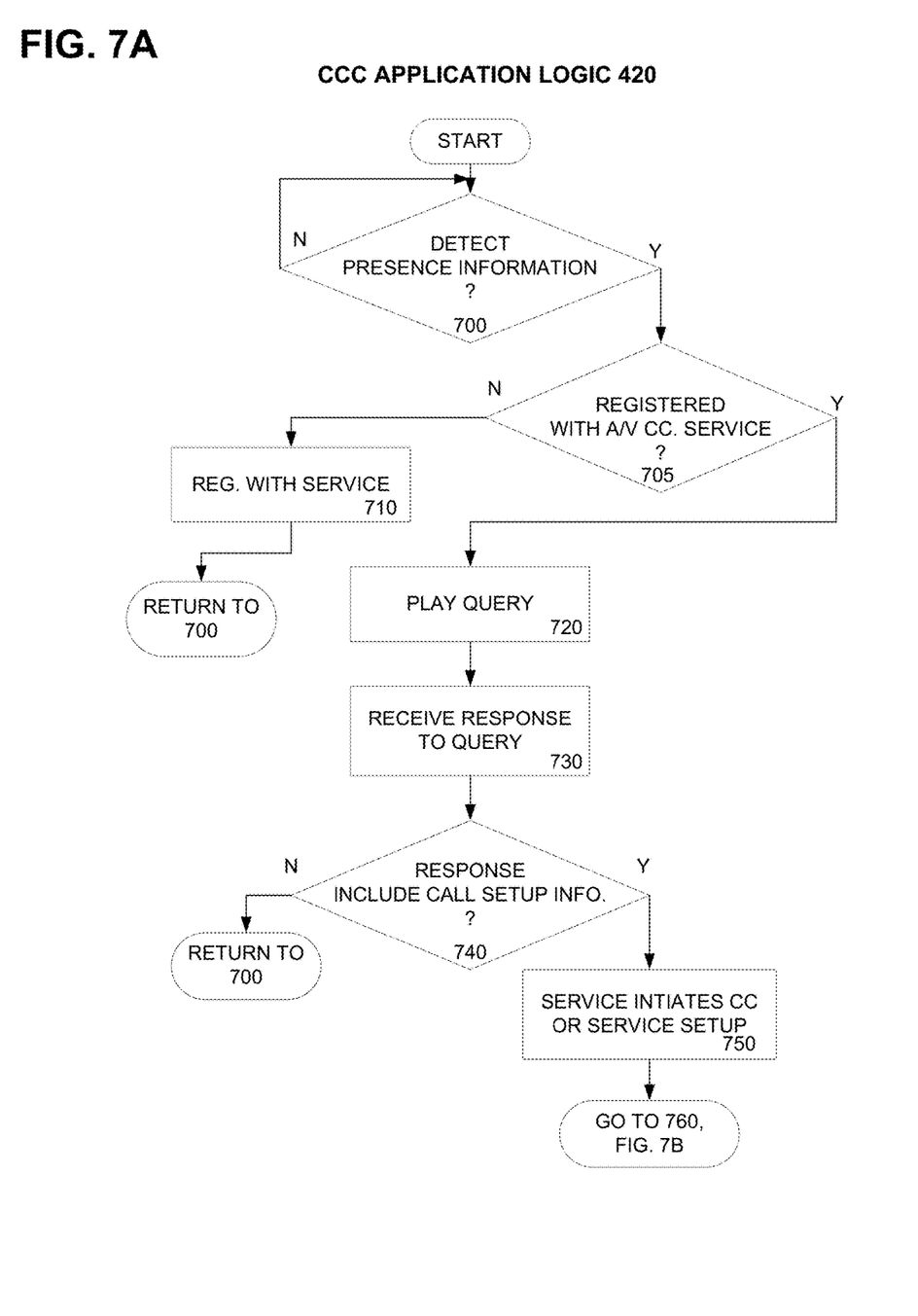
FIGS. 7A and 7B is a flow diagram illustrating one embodiment of conference call control logic 420.

Turning now to FIG. 7A which is a diagram showing the logical process that can be followed by the conference call control application logic 420 to assist with the CC setup and termination process. As indicated earlier, the logic 420 can run on a CCC application on a mobile device or on a conference application, such as the stationary device 240, and the logic is substantially the same when running on either device. The CCC application logic can operate in a background mode at 700 in which it periodically monitors its environment looking for presence information which can be the detection of an IPS signal or detection of one or more objects, such as one or more individuals or mobile electronic devices. If presence information is detected, the process proceeds to 705, otherwise the process loops on 700. At 705, logic initiates a routine to determine whether the mobile device or the CCC application 412A running on the mobile device (or 412B running on the appliance 240) is registered with an A/V CC service. In this regard, the application 412 can send a message to the A/V CC service with registration information that the service can use to authenticate the application 412 registration, and once authenticated the process can proceed to 720, otherwise a registration process can be initiated at 710. At 720, the logic can cause the query module 430 to play an appropriate query message from the store 431. The appropriate query that is played can depend upon characteristics of the presence information detected earlier in 700 and described in detail with reference to FIG. 5. The query can either be played by the mobile device (260), by the stationary device 240, or on a speaker or screen comprising the CR in which the mobile device is present, and at 730 a response to the query can be received. A response can be an indication by an individual present (responder) in the CR that they want to invite others to participate in a CC, or a response can be an indication that they would like to join a CC that is already in progress. The response can also include contact information and/or the identities of other individuals the responder would like to invite to participate in the CC. This response information can be sent to the A/V CC service 220 which can use this information to setup a CC, or to provide some other service not related to a CC. Such other services can include meeting transcription services, food delivery services, or other services that benefit the meeting participants in some manner. As indicated earlier, a CC can be initiated between any available near-end CR and one or more mobile communication devices or far-end CRs.

Figure 7B:
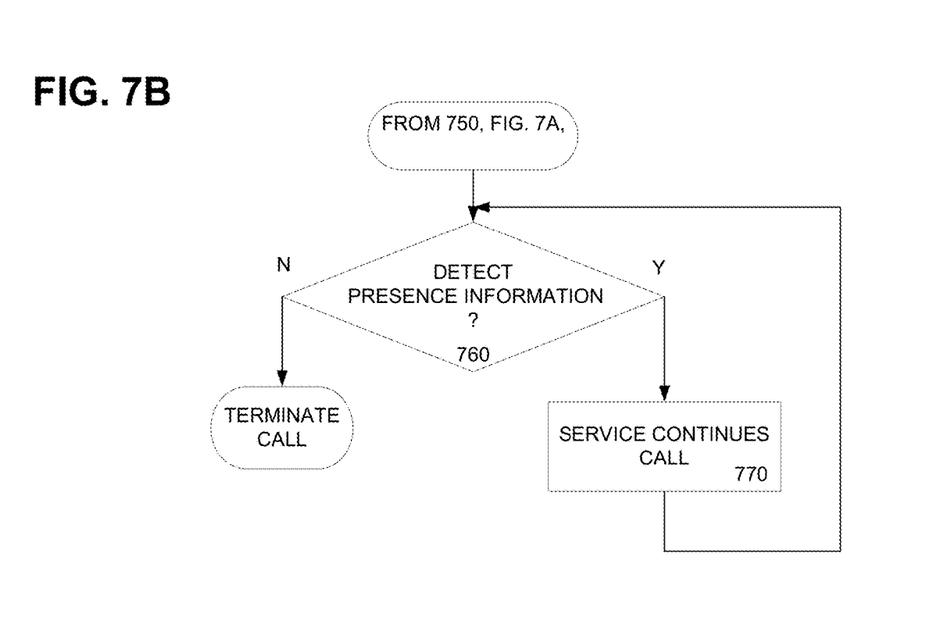

Referring now to FIG. 7B, at 760 the logical process periodically monitors presence information associated with the object(s) detected to be present in the CR in 700, and provided presence information is detected, the A/V CC service 220 continues to include the CR in the CC. The process loops between 760 and 770 until no presence information is detected in the CR, at which point the CC is terminated to the CR.

Figure 8A:
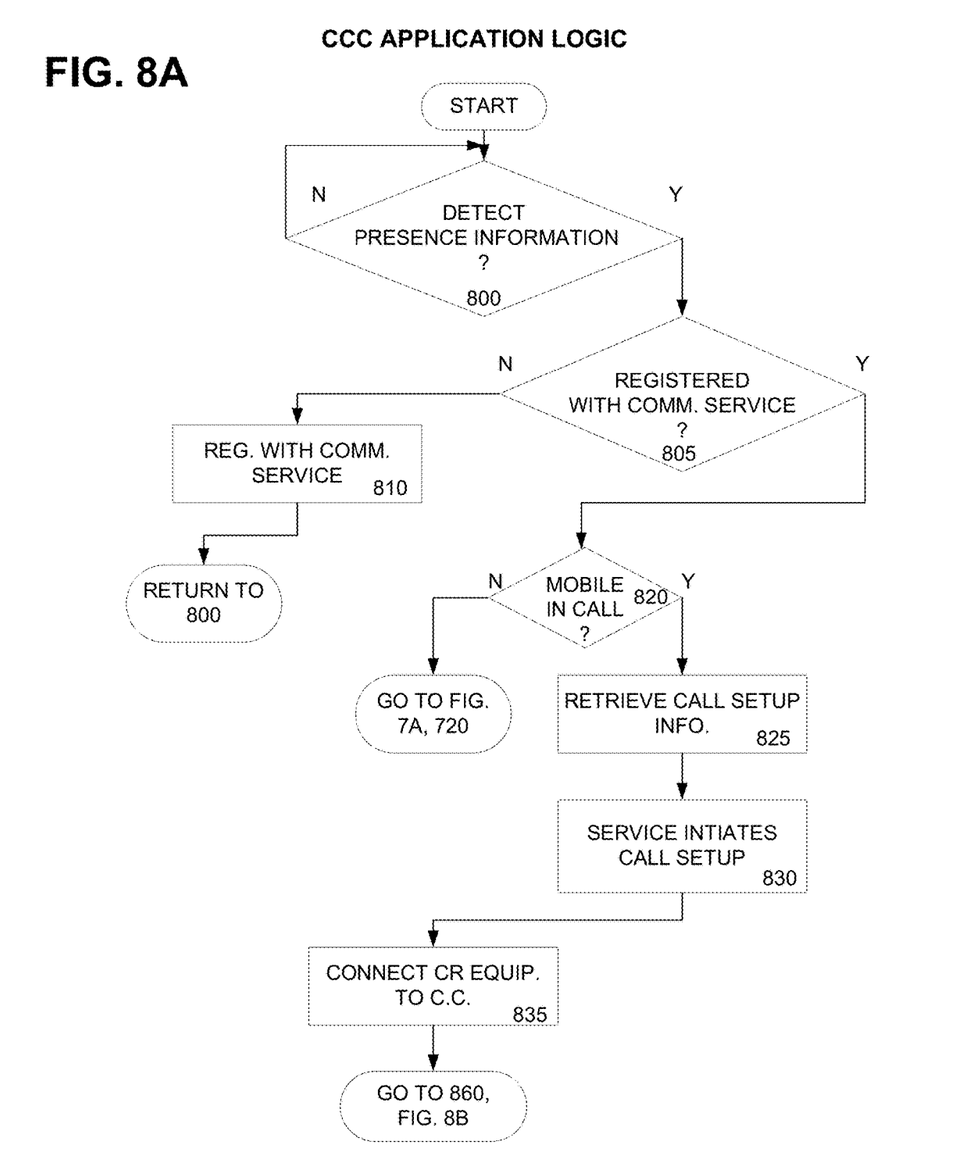
FIGS. 8A and 8B is a flow diagram illustrating another embodiment the conference call control logic 420.
Figure 8B:
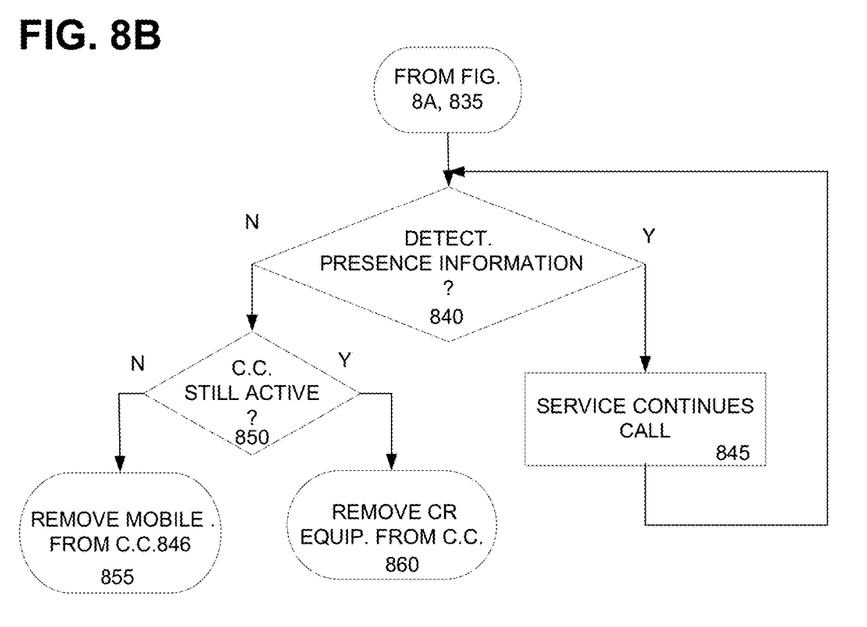

Turning now to a description of the logic illustrated in FIGS. 8A and 8B. This logic is very similar to the logic 420 described above with reference to FIGS. 7A and 7B, and differs at 820 where a determination is made whether or not an A/V conference application running on a mobile device whose presence is detected in 800 is currently in a CC. In other words, if a participant is engaged in a CC prior to the time that they move to a CR (CR equipment may or may not be supporting the CC), the logic is able to activate the A/V conference device, comprising the CR into which the participant moves, so that it can enter into and support the an ongoing CC. If at 820 the logic determines that the A/V CC application is currently in an active CC, then it can cause a message to be sent to the A/V CC service 220 to this effect, and the service 220 can connect the CR equipment to the CC. By the same token, the logic can transfer support for the CC back to the A/V conference application from the CR equipment if the participant moves away from the CR (presence is no longer detected by the CCC application) during the course of a CC.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for initiating a conference call, comprising:
    detecting, by a mobile communication device, a first short range wireless signal generated by a first indoor positioning device mapped to and located in a first conference space and at the same time detecting a second short range wireless signal generated by a second indoor positioning system device mapped to and located in a second conference space that is proximate to the first conference space, the mapping between the first and second indoor positioning systems and the conference spaces is maintained in a storage associated with a conference call service, and the first short range wireless signal is able to be propagated beyond the first conference space and the second short range wireless signal is not able to be propagated beyond the second conference space;
    transmitting by the mobile communication device over a network to the conference call service the identity of the first and the second indoor positioning system devices;
    determining by the conference call service that, based upon the identities and conference space mapping of the first and the second indoor positioning devices, the mobile communication device is present in the second conference space and receiving, from an individual operating the mobile communication device, conference call setup information, and
    the conference call service using the conference call setup information to initiate a conference call only between a conference device located in the second conferencing space and a conference device that is located in a conference space that is remote to the second conference space.

2. The method of claim 1, wherein the indoor positioning system is comprised of a beacon or an ultrasonic signal generation device.

3. The method of claim 1, further comprising the detection of the presence of the first individual causes the conference device to generate and play a query that can be perceived visually or audibly by the first individual.

4. The method of claim 3, further comprising the first individual responding to the query vocally with the call setup information, or responding to the query by manually entering the call setup information into the conference device.

5. The method of claim 1, wherein the call setup information comprises any one or more of an identity of the first individual, the identities of one or more other individuals, contact information corresponding to each of the individuals, conference call specific information, and a conference call starting time.

6. The method of claim 1, wherein the conference device is either a mobile communication device or a stationary communication device.

7. The method of claim 6, wherein the mobile communication device is a wireless phone, a tablet computer, a personal digital assistant, a laptop computer, or any other mobile computational device that can be connected to a wireless network.

8. The method of claim 6, wherein that stationary communication device is an audio or video conference appliance.

9. The method of claim 1, wherein the at least one far-end comprises either a mobile communication device, or comprises a conference appliance in another one of the plurality of the conference spaces.

10. A method of connecting a stationary conference device in any one of a plurality of conference spaces to an active conference call, comprising:
    participating in an active conference call, by an individual using a mobile communication device, while the individual is not proximate to any of the plurality of the conference spaces;
    entering into one of the plurality of the conference spaces and detecting, by the mobile communication device, a first short range wireless signal generated by a first indoor positioning device mapped to and located in a first one of the plurality of the conference spaces and at the same time detecting a second short range wireless signal generated by a second indoor positioning system device mapped to and located in a second one of the plurality of conference spaces that is proximate to the first conference space, the mapping between the first and second indoor positioning systems and the conference spaces are maintained in a storage associated with a conference call service, and the second short range wireless signal is not able to be propagated beyond the second conference space;
    transmitting by the mobile communication device over a network to the conference call service the identity of the first and the second indoor positioning system devices;
    determining by the conference call service that, based upon the identities and conference space mapping of the first and second indoor positioning system devices, the mobile communication device is present in the second one of the plurality of the conference spaces, and receiving from an individual operating the mobile communication device conference call setup information; and
    the conference call service using the presence information to connect the stationary conference device in the second one of the plurality of the conference spaces to the conference call.

11. The method of claim 10, wherein a portion of the functionality comprising the mobile conference device is disabled during the time that the stationary conference device is connected to the conference call.

12. The method of claim 11 wherein the functionality comprising the mobile conference device that is disabled is any one or more of a loud speaker, a microphone, camera and a display.

13. The method of claim 11, further comprising enabling the previously disabled portion of the functionality comprising the mobile communication device when the presence of the individual is no longer detected in the second one of the plurality of the conference spaces.

14. The method of claim 13, further comprising the stationary conference device being disconnected from the conference call when the presence of the individual is no longer detected in the second one of the plurality of the conference spaces.

15. The method of claim 10, wherein the presence of the first individual is detected by indoor positioning system functionality operating on the first conference device in the second one of the plurality of conference spaces.

16. The method of claim 10, wherein the any one of the plurality of the conference spaces is associated with presence information that uniquely identifies the space.

17. The method of claim 16, wherein the presence information that uniquely identifies the any one of the plurality of the conference space is received by the first conference device in a signal from a beacon located in the space.

18. A system for initiating a conference call, comprising:
    a first conference device connected to a network and located in a first one of a plurality of conference spaces, and a second conference device connected to the network and located in a second one of the plurality of the conference spaces that is proximate to the first conference space; and
    an A/V conference call service operating in the network to connect the first conference device located in the first one of a plurality of conference spaces with the second conference device located in the second one of the plurality of the conference spaces when:
    a mobile communication device detects a first short range wireless signal generated by a first indoor positioning device mapped to and located in the first conference space and at the same time detects a second short range wireless signal generated by a second indoor positioning system device mapped to and located in the second conference space, the mapping between the first and second indoor positioning systems and the conference spaces being maintained in a storage associated with the conference call service, and the second short range wireless signal is not able to be propagated beyond the second conference space; and the mobile communication device transmitting over the network to the conference call service the identities of the first and the second indoor positioning system devices; and the conference call service determining that, based upon the identities and conference space mapping of the first and the second indoor positioning system devices, the mobile communication device is present in the second conference space and using the presence information to connect the mobile communication device to the second conference device.

19. The method of claim 18, wherein the conference call setup information is the name of an individual associated with the second conference device or the identity of a second one of the plurality of the conference space.

20. The method of claim 19, further comprising the detection of the presence of the individual causes the second conference device to generate and play a query that can be perceived visually or audibly by the individual.

21. The method of claim 20, further comprising the individual responding to the query vocally with the conference call setup information, or responding to the query by manually entering the call setup information into the second conference device.

\* \* \* \* \*

UNITED STATES PATENT AND TRADEMARK OFFICE
CERTIFICATE OF CORRECTION

PATENT NO. : 9,948,891 B1  
APPLICATION NO. : 15/472612  
DATED : April 17, 2018  
INVENTOR(S) : Schau et al.

Page 1 of 1

It is certified that error appears in the above-identified patent and that said Letters Patent is hereby corrected as shown below:

On the Title Page

Item (73) should read:  
(73) Assignee   Ziiproom, Inc., Burlington, MA (US)

Signed and Sealed this  
Third Day of July, 2018

Andrei Iancu  
*Director of the United States Patent and Trademark Office*